United States Patent
Kollar et al.

(12) 
(10) Patent No.: US 11,134,420 B1
(45) Date of Patent: Sep. 28, 2021

(54) PROLONGING VOICE SERVICE IN AN ACTIVE STATE

(71) Applicant: NOKIA TECHNOLOGIES OY, Espoo (FI)

(72) Inventors: Martin Kollar, Kosice (SK); Arkadiusz Zieba, Gdansk (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/205,600

(22) Filed: Mar. 18, 2021

(30) Foreign Application Priority Data

May 13, 2020 (WO) .................. PCT/FI2020/050320

(51) Int. Cl.
*H04W 36/00* (2009.01)
*H04W 36/08* (2009.01)

(52) U.S. Cl.
CPC ....... *H04W 36/0033* (2013.01); *H04W 36/08* (2013.01)

(58) Field of Classification Search
CPC ... H04W 76/19; H04W 76/15; H04W 36/305; H04W 36/0079; H04W 36/08; H04W 76/18; H04W 76/27; H04W 76/38; H04W 76/10; H04W 76/30; H04W 36/0055; H04W 36/0083; H04W 36/0033; H04W 36/00; H04W 36/22
See application file for complete search history.

(56) References Cited

U.S. PATENT DOCUMENTS

| | | | |
|---|---|---|---|
| 8,019,334 B2 | 9/2011 | Koskela et al. | |
| 10,356,680 B1 * | 7/2019 | Kollar | ................... H04W 76/18 |
| 2013/0083646 A1 | 4/2013 | Hietalahti et al. | |
| 2014/0228066 A1 | 8/2014 | Zhao et al. | |
| 2019/0174571 A1 * | 6/2019 | Deenoo | ................ H04W 76/11 |
| 2019/0246318 A1 * | 8/2019 | Kim | ................. H04W 36/0055 |
| 2019/0306764 A1 * | 10/2019 | da Silva | ................ H04W 36/04 |
| 2020/0128608 A1 | 4/2020 | Yang | |
| 2020/0228278 A1 | 7/2020 | Park et al. | |
| 2020/0344019 A1 * | 10/2020 | Da Silva | ............. H04B 7/0626 |
| 2021/0058834 A1 * | 2/2021 | Paladugu | ........ H04W 36/00835 |

FOREIGN PATENT DOCUMENTS

| | | | | |
|---|---|---|---|---|
| CN | 109151940 A * | 1/2019 | ............ H04W 60/04 |
| WO | WO 2009/075341 A1 | 6/2009 | |
| WO | WO-2009096883 A1 * | 8/2009 | .......... H04W 36/305 |
| WO | WO-2019211130 A1 * | 11/2019 | ............ H04W 76/18 |

OTHER PUBLICATIONS

International Search Report and Written Opinion dated Sep. 18, 2020 corresponding to International Patent Application No. PCT/FI2020/050320.

* cited by examiner

*Primary Examiner* — Allahyar Kasraian
(74) *Attorney, Agent, or Firm* — Squire Patton Boggs (US) LLP

(57) ABSTRACT

An arrangement for prolonging voice service in an active state by forcing a double user equipment context situation. This is achieved by delaying the user equipment context release message from the source cell to the core network. When the user equipment context release message is delayed the connection with a target cell can be established before the voice service is dropped and the user does not need to redial.

19 Claims, 2 Drawing Sheets

PROLONGING VOICE SERVICE IN AN ACTIVE STATE

DESCRIPTION OF BACKGROUND

The following disclosure relates to wireless communication systems. Mobile communication networks have evolved into complex arrangements. One operator can operate a network comprising a plurality of cells of different network technologies. These networks are able to serve a high number of user devices. Recently the number of devices has been growing because so called Internet of Things which has led into an increased number of devices or user equipment. The number is expected to grow in the future.

One device, such as a mobile phone, can be located within coverage of several different cells. Sometimes the device loses the connectivity in a first cell, which is commonly called a source cell, but can recover from lost connectivity in another cell, which is commonly called a target cell. Thus, it is possible to keep the call as active without the need for redialing on the end user side. This situation is called as a double S1 within the context of LTE. In another network technologies different names can be used, such as double NG (next generation). More general expression double user equipment context is used in this disclosure to refer to these two examples and similar situation in other network technologies A typical example of a such situation is when a Voice over LTE call, or a voice session in general, is ongoing. The user equipment loses synchronization and sends an RRC reestablishment request on an unprepared target cell. The unprepared target cell will respond to the request by sending an RRC reestablishment rejection to the user equipment. Consequently, the user equipment will go to the idle state and send a new RRC request. When MME receives a service request via the target cell, it will already have user equipment context from the source cell. However, at this stage the radio link failure timer has not yet expired at the source cell. Thus, MME will send to the user equipment a context release command message. Such release is counted as either normal or abnormal according to the cause value received within the user equipment context release command message from MME. However, the above described double S1 situation, or similar, does not always happen as the source cell may detect the loss of synchronicity and send a user equipment context release request message in order to release resources.

SUMMARY

The following disclosure discloses an arrangement for prolonging voice service in an active state by forcing a double user equipment context situation. This is achieved by delaying the user equipment context release request message from the source cell to the core network. When the user equipment context release request message is delayed the connection with a target cell can be established before the voice service is dropped and the user does not need to redial.

In an aspect a network element is disclosed. The network element comprises a circuitry configured to: detect an internal user equipment context release with regard a voice session between a user equipment and the network element, wherein the internal user equipment release has been triggered due to a radio failure when a radio link failure timer has not been started; and postpone the transmission of the user equipment context release request message in accordance with a delay.

It is beneficial to delay the transmission of the user equipment context release request message so that a double user equipment context situation is forced. This reduces the number of dropped calls and the need for redialing.

In an embodiment the circuitry is further configured to determine the delay for a transmission of a user equipment context release request message. It is beneficial to determine a delay that optimizes the length of the delay so that the double user equipment context situation to happen. Furthermore, when the delay is optimized it does not keep the resources reserved unnecessarily long but releases them.

In an embodiment the circuitry is before detecting an internal user equipment context release further configured to: compute a ratio between a number of delayed releases, wherein the radio link failure timer was not started and the release resulted in a double user equipment context situation; and a number of delayed releases, wherein the radio link failure time was not started; compare the computed ratio with a predetermined threshold; and if the computed ratio is above the threshold the circuitry is further configured to postpone an internal user equipment context release. It is beneficial to compute the ratio of key performance indicators in order to facilitate the detection of the double user equipment context situation.

In an embodiment the double user equipment context is one of the following: S1 of a Long-Term Evolution or NG of a fifth generation. It is beneficial to detect particularly S1 or NG as the double user equipment context situation can reduce the quality experienced by the customer.

In an embodiment the network element is further configured to receive a user equipment release command message from the core network. It is beneficial to receive the user equipment release command message from the core network so that transmitting the user equipment release command message from the source cell can be omitted.

In an embodiment the delay is based on the arithmetic mean of samples, wherein in each sample is given as a point of time when the user equipment release command message with the cause related to the double user equipment context is received from the core network. It is beneficial to use the arithmetic mean as described above as it provides a suitable value for the delay. Furthermore, when the delay is optimized it does not keep the resources reserved unnecessarily long but releases them. The arithmetic mean provides a good basis for this.

In an embodiment the circuitry is further configured to deduct from the delay the point in time when the network element internally evaluates radio link failure for the user equipment and the radio link failure timer has been started. It beneficial to deduct the delay from the point in time so that the delay will not be unnecessarily long. Furthermore, when the delay is optimized it does not keep the resources reserved unnecessarily long but releases them. The arithmetic mean when deducted the point in time provides a good basis for this.

In an embodiment the circuitry is further configured to receive the user equipment context release command message from the mobile management entity before the circuitry evaluates the radio link failure for the user equipment and starts the radio link failure timer. It is beneficial to receive the user equipment context release command message from the mobile management entity so that the circuitry can omit sending it.

In an embodiment the circuitry is further configured to receive the user equipment context release command message from the 5G core access and mobility management function before the circuitry evaluates the radio link failure for the user equipment and starts the radio link failure timer. It is beneficial to receive the user equipment context release command message from 5G core access and mobility management function so that the circuitry can omit sending it.

In an aspect a method is disclosed. The method comprises: detecting an internal user equipment context release with regard a voice session between a user equipment and the network element, wherein the internal user equipment release has been triggered due to a radio failure when a radio link failure timer has not been started; and postponing the transmission of the user equipment context release request message in accordance with a delay.

In an embodiment the method further comprises determining the delay for a transmission of a user equipment context release request message.

In an embodiment before detecting an internal user equipment context release the method further comprises: computing a ratio between a number of delayed releases, wherein the radio link failure timer was not started and the release resulted in a double user equipment context situation; and a number of delayed releases, wherein the radio link failure time was not started; comparing the computed ratio with a predetermined threshold; and if the computed ratio is above the threshold the method further comprises postponing an internal user equipment context release.

In an embodiment the double user equipment context is one of the following: S1 of a Long-Term Evolution or NG of a fifth generation.

In an embodiment the method further comprises receiving a user equipment release command message from the core network.

In an embodiment the delay is based on the arithmetic mean of samples, wherein in each sample is given as a point of time when the user equipment release command message with the cause related to the double user equipment context is received from the core network.

In an embodiment the method further comprises deducting from the delay the point in time when the network element internally evaluates radio link failure for the user equipment and the radio link failure timer has been started.

In an embodiment the method further comprises receiving the user equipment context release command message from the core network before the circuitry evaluates the radio link failure for the user equipment and starts the radio link failure timer.

In an embodiment the method further comprises receiving the user equipment context release command message from the 5G core access and mobility management function before the circuitry evaluates the radio link failure for the user equipment and starts the radio link failure timer.

In an aspect a network element is disclosed. The network element comprises: means for detecting an internal user equipment context release with regard a voice session between a user equipment and the network element, wherein the internal user equipment release has been triggered due to a radio failure when a radio link failure timer has not been started; and means for postponing the transmission of the user equipment context release request message in accordance with a delay.

In an embodiment the network element further comprises means for determining the delay for a transmission of a user equipment context release request message.

In an embodiment the network element further comprises: means for computing before detecting an internal user equipment context release a ratio between a number of delayed releases, wherein the radio link failure timer was not started and the release resulted in a double user equipment context situation; and a number of delayed releases, wherein the radio link failure time was not started; means for comparing the computed ratio with a predetermined threshold; and if the computed ratio is above the threshold the network element further comprises means for postponing an internal user equipment context release.

In an embodiment the double user equipment context is one of the following: S1 of a Long-Term Evolution or NG of a fifth generation.

In an embodiment the network element further comprises means for receiving a user equipment release command message from the core network.

In an embodiment the delay is based on the arithmetic mean of samples, wherein in each sample is given as a point of time when the user equipment release command message with the cause related to the double user equipment context is received from the core network.

In an embodiment the network element further comprises means deducting from the delay the point in time when the network element internally evaluates radio link failure for the user equipment and the radio link failure timer has been started.

In an embodiment the network element further comprises means for receiving the user equipment context release command message from the core network before the circuitry evaluates the radio link failure for the user equipment and starts the radio link failure timer.

In an embodiment the network element further comprises means for receiving the user equipment context release command message from the 5G core access and mobility management function before the circuitry evaluates the radio link failure for the user equipment and starts the radio link failure timer.

The method described above may be implemented as a computer program product comprising computer program code, wherein the computer program code is configured to cause the method as described above, when the computer program code is executed by a computing device. The computing device may be a network element as described above and the functionality may be implemented as a software, hardware or a combination of thereof.

BRIEF DESCRIPTION OF THE DRAWINGS

The accompanying drawings, which are included to provide a further understanding of the prolonging voice service in an active state arrangement and constitute a part of this specification, illustrate example embodiments and together with the description help to explain the principles of the prolonging voice service in an active state. In the drawings.

DETAILED DESCRIPTION

Reference will now be made in detail to the example embodiments, examples of which are illustrated in the accompanying drawings.

The following example relates managing double user equipment context situation in general. The example particularly refers to Long Term Evolution (LTE) and also to fifth generation (5G) mobile telecommunication network technology, also known as New Radio (NR). Even if LTE and 5G are used as examples the principles disclosed may be used in different cellular radio implementations including 2G, 3G, Cellular IoT RAN, Cellular Radio HW and similar.

Figure 1:
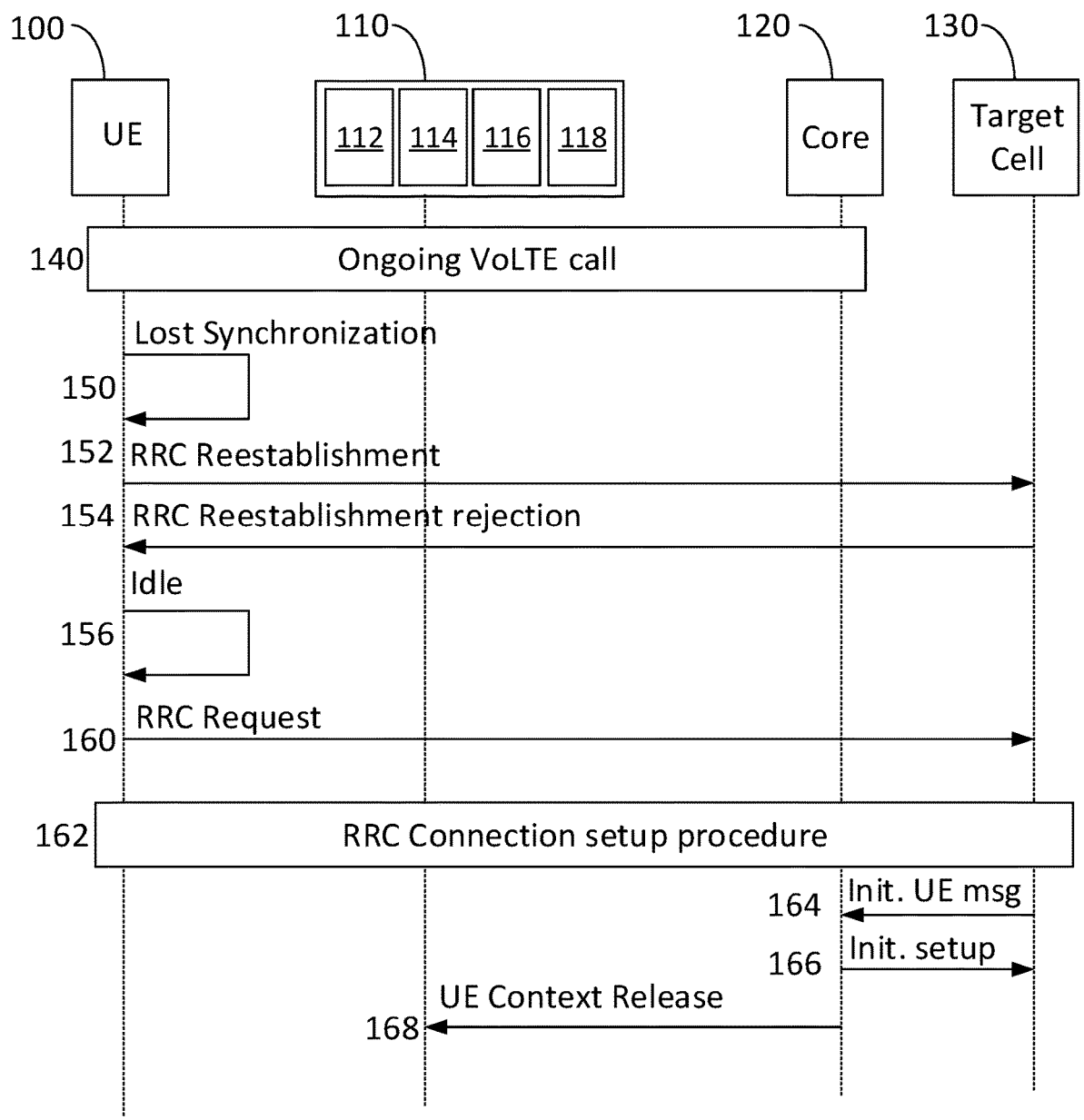
FIG. 1 is an example of an arrangement with prolonging voice service in an active state.

FIG. 1 discloses an example of a signaling chart between different entities. The entities include User Equipment 100, a source cell 110, a core network 120 and a target cell 130. The source cell further includes a circuitry 112-118 for performing common tasks of a cell of a telecommunication network. The circuitry further comprises at least one processor 112 configured to perform computing related tasks, at least one memory 114 for storing computer programs and data, at least one antenna part 116 for communicating with a plurality of user equipment and a network connection 118 for communicating with core network or similar means for performing similar tasks. In this disclosure the core network 130 refers particularly to the mobility management entity of an LTE network or 5G Core Access and Mobility Management Function of a 5G network. Core network comprises also other components and functionality which, however, do not contribute to the described arrangement and method of prolonging voice service in an active state. The target cell 130 may be similar to the source cell 110, however, they need not to be identical.

In the example of FIG. 1 the UE 100 is having an ongoing Voice over LTE call, step 140, with a second user equipment. The UE is communicating with other devices, for example a second user equipment, using the source cell 110 and the core network 120. In order to establish a Voice over LTE call with a second user equipment first QCI5 E-RAB must be established to transmit the needed Session Initiation Protocol (SIP) indication messages. Despite the possibility for the QCI5 E-RAB to be established via Initial context setup procedure, the QCI1 E-RAB is typically established afterwards. This happens when the needed signaling link is already in use, for example, via E-RAB setup procedure. An exception to this in LTE networks is the double S1 scenario, in which the VoLTE call, or similar voice call using another network technology, is already ongoing.

During the call the synchronization of the connection is lost, step 150. In the example of FIG. 1 the user equipment 100 tries to solve the situation by sending an RRC establishment request 152 to the target cell 130. The target cell 130 is not expecting this request and is unprepared. The unprepared target cell 130 responds to the request by sending an RRC establishment rejection 154 to the user equipment 100. As a consequence, the user equipment 100 will go into idle state, step 156.

After going into idle state the user equipment 100 sends new RRC request 160 to the target cell 130. The new RRC request is successfully completed, step 162. After the RRC Connection setup procedure has been successfully completed, the Initial UE message 164 is sent from eNB of the target cell 130 to the core network 120. This is then answered via Initial Context Setup Request message 166 from the core network 120. The message includes QCI1 E-RAB within the "E-RAB to be setup list". This is because the VoLTE is already ongoing and all needed E-RABs for VoLTE call are already established in the evolved packet core (EPC), there is no need to establish them again and re-dial the call. When the core network 120 receives service request within the Initial UE message 164 via the target cell 130, it will realize that it already has the established the UE context from the source cell 110, wherein the radio link failure timer is still not expired. Thus, the core network 120 will send UE Context Release Command message 168 to the source cell 110. It shall be noted that currently 3GPP standards do not prevent the core network from sending, in principle, any cause code within the given message. Examples of such vendor dependent causes are given in the table below.

| MME vendor | cause |
| --- | --- |
| Nokia | NAS normal |
| Cisco | NAS normal |
| ALU | RNL UE connectivity lost |
| Ericsson | RNL: E-UTRAN Generated Reason |

The above arrangement and signaling is achieved by delaying sending the UE Context Release Request message. In an LTE network this is done by delaying the S1AP:UE Context Release Request message from the eNB of the source cell 110 to the mobile management entity (MME) of the core network 120 with regard causes related to radio quality reasons with 'UE connectivity lost' but T-RLF timer not started. The time interval for delaying the S1AP: UE Context Release Request message to the MME 130 is based on the monitoring of double S1 releases that already occurred in the observed cell. It is obtained as the average of samples where each one is given as point in time S1AP: UE context Release Command message with the cause related to the double S1 for the given MME vendor is received from the MME minus point in time when eNB internally evaluates radio link failure for the UE and T-RLF time has been started.

The method for determining the delay is just an example and the appropriate delay may be determined by using other methods. The delay used should not be too long so that the resources are released for other users. Thus, even if a constant delay could be used it is typically preferred as the shortest possible delay that is long enough for guaranteeing a double user equipment context situation is desired. Furthermore, it is possible that the delay is based on an internal or external signaling so that the source cell will use a delay that has been determined by another entity.

In an 5G network the same is done by delaying sending the NG: UE Context Release Request message from the gNB of the source cell 110 to the AMF of the core network 120 with regard causes related to radio quality reasons with 'UE connectivity lost' but T-RLF timer not started. The time interval for delaying the NG: UE Context Release Request message to the AMF is based on the monitoring of double NG releases that already occurred in the observed cell. It is obtained as the average of samples where each one is given as point in time NG: UE context Release Command message with the cause related to the double NG for the given AMF vendor is received from the AMF minus point in time when gNB internally evaluates radio link failure for the UE and T-RLF time has been started.

Figure 2:
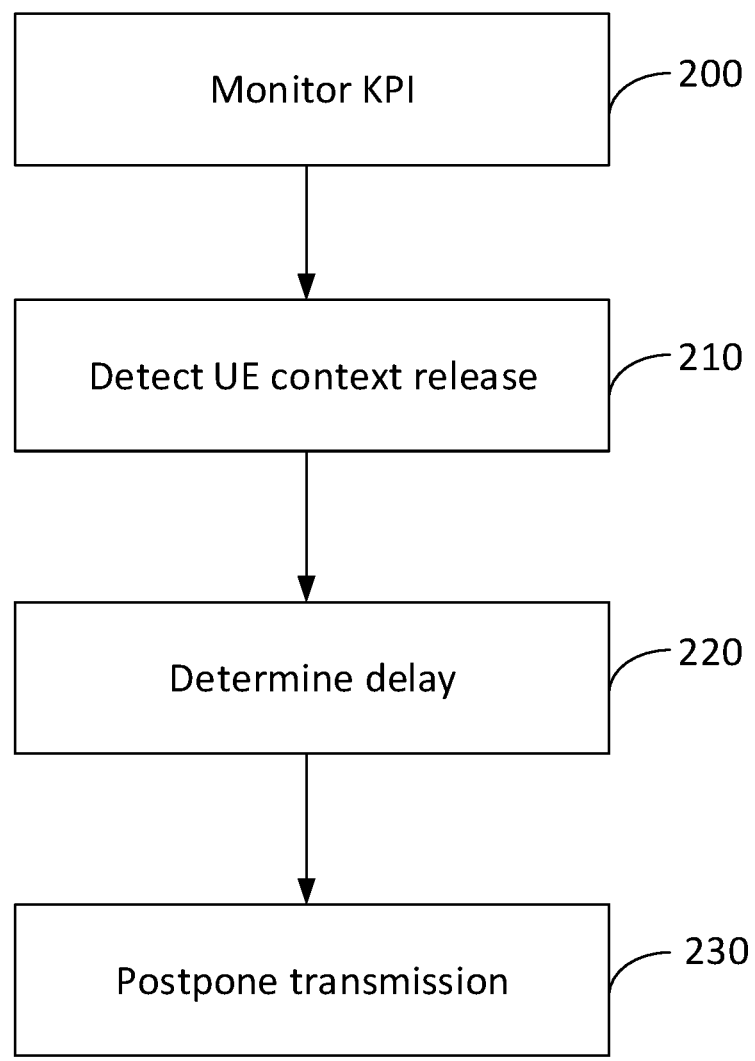
FIG. 2 is an example of a method of prolonging voice service in an active state.

FIG. 2 discloses an example of a such method. In the method the key performance indicators are monitored continuously, step 200. This may be performed by computing a ratio between a) a number of delayed releases, wherein the radio link failure timer was not started and the release resulted in a double user equipment context situation and b) a number of delayed releases, wherein the radio link failure time was not started. Then the computed ratio is compared with a predetermined threshold. If the computed ratio is above the threshold the method tries to detect if an internal user equipment release has been triggered with the active call due to a radio failure and user equipment connectivity lost when the radio link failure timer was not started, step 210.

When the user equipment release has been triggered a delay for a transmission of a user equipment context release request message is determined. The delay may be determined based on mean time interval for QCI1 E-RAB release due to double user equipment context. In an LTE network this may be obtained by taking the arithmetic mean of samples where each one is given as point in time when S1AP: UE context Release Command message with the cause related to the double S1 for the given QCI1 E-RAB is received from MME (without previous reception of the E-RAB Release Command message with NAS Normal cause related to the QCI1 E-RAB) minus point in time when eNB internally evaluates radio link failure for the UE and T-RLF time has been started.

When the delay has been determined the transmission of the user equipment context release request message will be postponed in accordance with the determined delay, step 230. As can be seen from FIG. 1 this means that the delay postpones the transmission so far in the future that the double user equipment context situation will occur and the source cell, which is the cell performing the method of FIG. 2, will actually receive the user equipment context release message from the MME of the core network. This means that the source cell can omit sending the user equipment context release request message that would have been sent after noticing the loss of synchronicity without the postponing procedure.

It should be noted that there is a scenario when despite the S1AP: UE Context Release Command message with cause related to double S1 for the given MME vendor is received but prior to reception of this message the QCI1 E-RAB Release Command message with the NAS Normal cause is received from the MME, which means that second party normally terminated the call by pressing the end call button. In this case despite the UE successfully reconnected to another cell QCI1 E-RAB will not be part of the "E-RAB to be setup list" of the Initial Context Setup Request message, which means that end user has to re-dial the call again.

As stated above, the components of the exemplary embodiments can include a computer readable medium or memories for holding instructions programmed according to the teachings of the present inventions and for holding data structures, tables, records, and/or other data described herein. A computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

As used in this application, the base station and/or user equipment may comprise a circuitry. The term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

An example of an access architecture that may be applied may be e.g. a radio access architecture based on long term evolution advanced (LTE Advanced, LTE-A) or new radio (NR, 5G), without restricting, however, the example embodiments to such an architecture. It is obvious for a person skilled in the art that the example embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wideband code division multiple access (WCDMA), systems using ultra-wideband (UWB) technology, sensor networks, mobile ad-hoc networks (MANETs) and Internet Protocol multimedia subsystems (IMS) or any combination thereof.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

It is obvious to a person skilled in the art that with the advancement of technology, the basic idea of the prolonging voice service in an active state may be implemented in various ways. The prolonging voice service in an active state and its example embodiments are thus not limited to the examples described above; instead they may vary within the scope of the claims.

The invention claimed is:

1. A network element comprising a circuitry configured to:

detect an internal user equipment context release with regard a voice session between a user equipment and the network element, wherein the internal user equipment context release has been triggered due to a radio failure when a radio link failure timer has not been started; and postpone the transmission of the user equipment context release request message in accordance with a delay.

2. The network element according to claim 1, wherein the circuitry is further configured to determine the delay for a transmission of a user equipment context release request message.

3. The network element according to claim 1, wherein the circuitry is before detecting an internal user equipment context release further configured to:

compute a ratio between a number of delayed releases, wherein the radio link failure timer was not started and the release resulted in a double user equipment context situation; and a number of delayed releases, wherein the radio link failure timer was not started;

compare the computed ratio with a predetermined threshold; and if the computed ratio is above the threshold the circuitry is further configured to postpone an internal user equipment context release.

4. The network element according to claim 1, wherein the double user equipment context is one of the following: S1 of a Long-Term Evolution or NG of a fifth generation.

5. The network element according to claim 1, wherein the network element is further configured to receive a user equipment release command message from a core network.

6. The network element according to claim 5, wherein the delay is based on the arithmetic mean of samples, wherein in each sample is given as a point of time when the user equipment release command message with the cause related to the double user equipment context is received from the core network.

7. The network element according to claim 6, wherein the circuitry is further configured to deduct from the delay the point in time when the network element internally evaluates radio link failure for the user equipment and the radio link failure timer has been started.

8. The network element according to claim 5, wherein the circuitry is further configured to receive the user equipment context release command message from the mobile management entity before the circuitry evaluates the radio link failure for the user equipment and starts the radio link failure timer.

9. The network element according to claim 5, wherein the circuitry is further configured to receive the user equipment context release command message from the 5G core access and mobility management function before the circuitry evaluates the radio link failure for the user equipment and starts the radio link failure timer.

10. A method comprising:

detecting an internal user equipment context release with regard a voice session between a user equipment and the network element, wherein the internal user equipment context release has been triggered due to a radio failure when a radio link failure timer has not been started; and postponing the transmission of the user equipment context release request message in accordance with a delay.

11. The method according to claim 10, wherein the method further comprises determining the delay for a transmission of a user equipment context release request message.

12. The method according to claim 10, wherein before detecting an internal user equipment context release the method further comprises:

computing a ratio between a number of delayed releases, wherein the radio link failure timer was not started and the release resulted in a double user equipment context situation; and a number of delayed releases, wherein the radio link failure timer was not started;

comparing the computed ratio with a predetermined threshold; and if the computed ratio is above the threshold the method further comprises postponing an internal user equipment context release.

13. The method according to claim 10, wherein the double user equipment context is one of the following: S1 of a Long-Term Evolution or NG of a fifth generation.

14. The method according to claim 10, wherein the method further comprises receiving a user equipment release command message from a core network.

15. The method according to claim 10, wherein the delay is based on the arithmetic mean of samples, wherein in each sample is given as a point of time when the user equipment release command message with the cause related to the double user equipment context is received from the core network.

16. The method to claim 15, wherein the method further comprises deducting from the delay the point in time when the network element internally evaluates radio link failure for the user equipment and the radio link failure timer has been started.

17. The method according to claim 10, wherein the method further comprises receiving the user equipment context release command message from the core network before the circuitry evaluates the radio link failure for the user equipment and starts the radio link failure timer.

18. The method according to claim 10, wherein the method further comprises receiving the user equipment context release command message from the 5G core access and mobility management function before the circuitry evaluates the radio link failure for the user equipment and starts the radio link failure timer.

19. A computer program embodied on a non-transitory computer-readable medium, wherein the computer program comprises computer-executable instructions which, when executed on a computing device, are configured to cause the computing device to execute the method according to claim 10.

* * * * *